United States Patent [19]

Cook et al.

[11] 4,179,921
[45] Dec. 25, 1979

[54] COMBUSTION PROCESS EFFICIENCY INDICATOR

[76] Inventors: Charles C. Cook, 18609 Greenhaven St., Covina, Calif. 91722; Harry R. Taplin, 1540 Kirk Ave., Thousand Oaks, Calif. 91360

[21] Appl. No.: 883,803

[22] Filed: Mar. 6, 1978

[51] Int. Cl.$^2$ .......................................... G01M 19/00
[52] U.S. Cl. ...................................................... 73/112
[58] Field of Search ........................ 73/112; 122/504.2

[56] References Cited
U.S. PATENT DOCUMENTS

| | | | |
|---|---|---|---|
| 1,686,186 | 10/1928 | Spitzglass | 73/112 |
| 1,730,541 | 10/1929 | Spitzglass | 73/112 |
| 3,089,340 | 5/1963 | Hageman | 73/363.9 |

Primary Examiner—Anthony V. Ciarlante
Attorney, Agent, or Firm—Jack C. Munro

[57] ABSTRACT

An indicator device to directly determine the efficiency of an external combustion apparatus such as a boiler. The face of the indicator includes an efficiency scale which has been preselected for the particular boiler apparatus based on the percentage of discharge of carbon dioxide within the combusted gases. The indicator measures the temperature of the combusted gases and through a movable pointer indicates directly the efficiency of the combustion process by the position of the pointer with respect to the face of the indicator. The indicator uses a second pointer which is to register and remain fixed at the minimum operating efficiency of the boiler.

6 Claims, 7 Drawing Figures

U.S. Patent  Dec. 25, 1979  Sheet 1 of 2  4,179,921
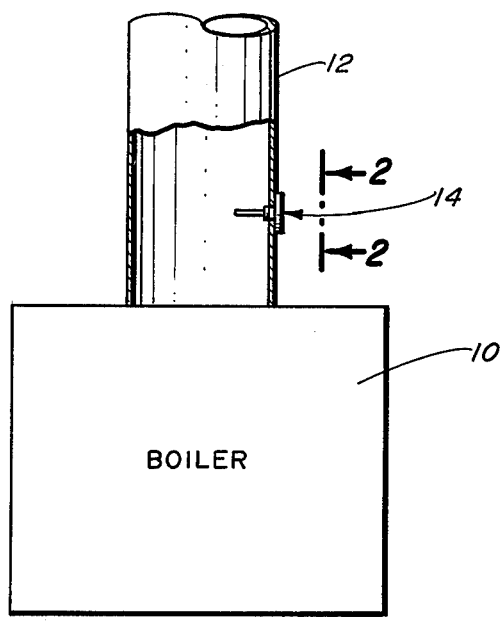
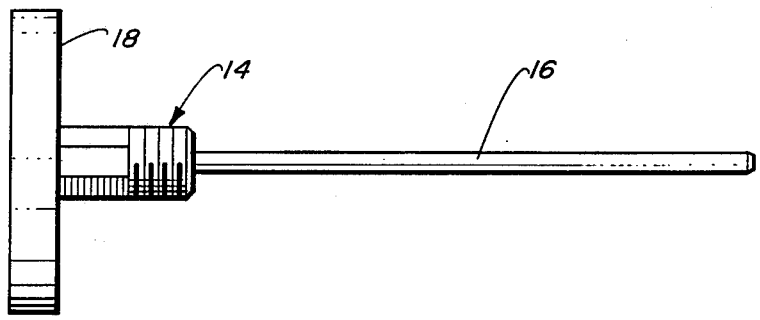
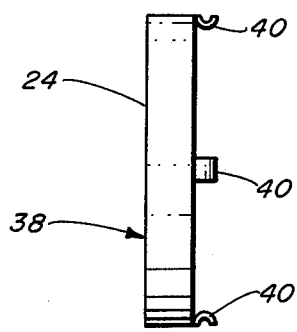
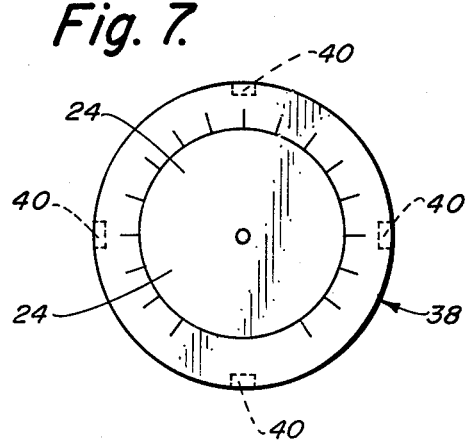

COMBUSTION PROCESS EFFICIENCY INDICATOR

BACKGROUND OF THE INVENTION

Heretofore, there has been no known device available which could indicate directly the efficiency of an external combustion, heat exchange process. Various types of temperature registering devices have been utilized to indicate the temperature of combusted gases which are being discharged into the ambient. But, there has been no known indicating device which gives direct readings of efficiency.

Additionally there has been no device available to indicate the expected operating efficiency of an external combustion process even with the combustion process not operating.

Further there has not been known a device which is to indicate changes in the combustion process efficiency for an external combustion apparatus.

One of the primary reasons that there has not been a device to indicate efficiency directly is that efficiency of a combustion apparatus requires an analysis of the exit gas constituents and exit gas temperature is also required. The measurement of exit gas temperature is most common and can be readily ascertained. To calculate efficiency also requires the measurement by means of a gas analyzer to determine the percentage within the exit gas of carbon dioxide, oxygen and carbon monoxide. These readings can be employed within a certain mathematical formula to calculate the efficiency of the boiler for that moment of time that the test was performed. Most operators of boilers are not able to calculate the efficiency for their boiler either due to not having the special equipment needed to perform the gas analysis or not having the skill in order to make the efficiency calculation.

A boiler operating at poor efficiency can use 25% more fuel than the same boiler operating at close to optimum efficiency. This increased use of fuel can prove to be quite costly within a very short period of time of operating the boiler.

Use of only a temperature gauge to give an indication of the operating efficiency of a boiler is an unsatisfactory determination of efficiency. Additionally the boiler is not observed constantly which means that at a point in time when the boiler is observed it may be operating at fair efficiency when sometime prior to the observation the boiler had been operating at poor efficiency. There should be some means to not only record efficiency at the present operating time of the boiler but also record the lowest operating efficiency of the boiler.

SUMMARY OF THE INVENTION

The subject matter of this invention provides for the installation of a new indicator device in conjunction with a boiler or other similar type heat exchange apparatus or the modifying of an existing temperature indicating indicator mounted within a boiler. The indicator face is altered to read directly the efficiency and also to record lowest efficiency achieved over a period of time. At a time when the boiler is operating at maximum efficiency, usually after a periodic maintenance operation, an analysis is made of the exhaust gases from the boiler. The analysis is to measure the percentage of carbon dioxide. In the arriving at an efficiency scale the percentage of carbon dioxide in the exhaust gas and the type of fuel used are basic factors. There will be a separate indicator scale for each value of carbon dioxide for each type of fuel. There are made two reasonable basic assumptions, the first one being that the air to fuel ratio, which establishes the carbon dioxide value, will not change appreciably and the second one is that the air inlet temperature for the combustion process remains constant. This allows for the use of an efficiency scale based on a constant value of carbon dioxide and having one particular variable, that being the exhaust gas temperature. To assume at the outset that the air/fuel ratio will remain constant is reasonable for simple mechanical equipment. To assume that the combustion process inlet temperature will remain constant is also reasonable for a broad range of applications including temperature controlled buildings and basement heating units. Once the percentage of carbon dioxide within the exhaust gases is determined, a particular efficiency scale is selected and placed on the face of the temperature indicator mounted in conjunction with the boiler. The face of the indicator should register the efficiency at any given moment of the boiler. Also, there should be a second pointer employed which will record the lowest efficiency attained in the operation of the boiler since the time of calibration.

BRIEF DESCRIPTION OF THE DRAWINGS

FIG. 1 is a schematic view of a boiler within which is to be employed an indicator constructed in accordance with this invention;

FIG. 5 is a side view of a conventional bimetal thermometer which can be employed in conjunction with this invention;

FIG. 6 is a side view of a clip on type of indicator face which is to be attachable to the front face of the thermometer shown within FIG. 5;

FIG. 7 is a front view of the clip on ring shown within FIG. 6.

DETAILED DESCRIPTION OF THE SHOWN EMBODIMENT

Figure 2:
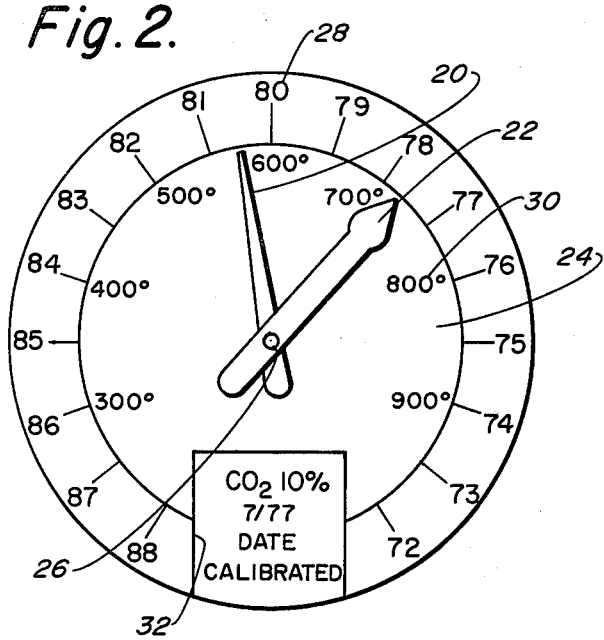
FIG. 2 is a front view of a first embodiment of an indicator face which is to be employed in conjunction with a temperature registering indicator.

Referring particularly to the drawing, there is depicted within FIG. 1 a conventional boiler which is to combust a fuel/air mixture therein and discharge combusted gases through flue 12 to the ambient. Mounted in conjunction with the flue 12 is a temperature indicating device 14. The temperature indicating device 14 is basically conventional with a bimetal type of device normally being used. However, it is considered to be within the scope of this invention that any type of temperature indicating device can be employed.

The indicating device 14 includes a probe section 16 which is attached to a thermometer face 18. Probe 16 is to connect with first pointer 20 and second pointer 22. As the temperature of the probe 16 is varied, the pointer 20 will move in direct relation thereto across the face 24 of the indicator. The direct relation is deemed to be conventional in that as the temperature is decreased the pointer 20 will move in one given direction and as the temperature increases the pointer 20 will move in the opposite direction. Both pointers 20 and 22 are pivoted about the same pivot shaft 26. The pointer 22 is to be movable only in one direction and that direction being from a point of high efficiency to a lower efficiency. Also the movement of the pointer 22 is caused by the movement of the pointer 20 in the same direction. This means that although the boiler 10 is operating at a certain efficiency level and that efficiency level is higher than the lowest efficiency which was previously attained, that the pointer 22 will remain located at the point of lowest efficiency with the then present higher efficiency being recorded by the pointer 20.

The face 24 of the indicator can take any of numerous configurations. A typical configuration is that shown in FIG. 2 which is taken along the line 2—2 of FIG. 1. The indicator face shown in FIG. 2 has first sequential numerical indicia 28 which is to denote efficiency. The numerals range from seventy-two to eighty-eight which are to record the percentage efficiency of operation of the combustion process within the boiler 10. If the efficiency falls within 72% 78%, then the boiler 10 is operating within a poor efficiency range. If the percentage of efficiency is between 78% and 82%, then the boiler 10 is operating within a fairly efficient range. If the efficiency exceeds 82%, then the boiler is operating in an efficient operating range. It is to be noted that the indicator face 24 could also include a second type 30 of numerical indicia which is to denote the temperature range of the exhaust gases. The higher the temperature of the exhaust gases, the lower the efficiency.

It is further to be noted that several different types of faces will be employed for each different type of fuel (the different grades of fuel oil as well as the different types of natural gas) based on the percent of carbon dioxide within the exhaust gases. Within the area 32 on the indicator face 24 there may be denoted the percentage of carbon dioxide ascertained on the date calibrated and also the date the boiler was calibrated. This calibration information is to make it readily observable to the user of the boiler what period of time has ellapsed since the last periodic maintenance. Also the user of the boiler can at a glance, by observing pointer 22, precisely note the lowest operating efficiency of the boiler and by observing the pointer 20 know precisely the present operating efficiency of the boiler. The user then can make the decision at one point in time whether the operation of the boiler is so inefficient as to warrant a periodic maintenance which will cause the boiler to operate again efficiently.

Figure 3:
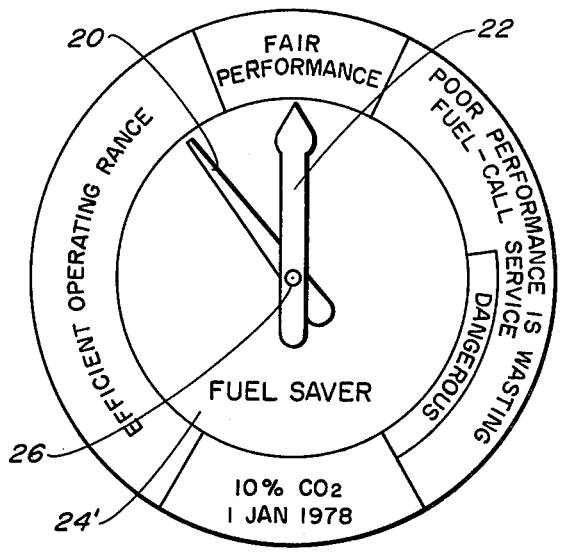
FIG. 3 is a view similar to FIG. 2 but of a second embodiment of indicator face.

Within FIG. 3 the indicator face 24' is depicted differently not having numerical indicia which indicates directly to the user of the percentage efficiency of the boiler 10.

Figure 4:
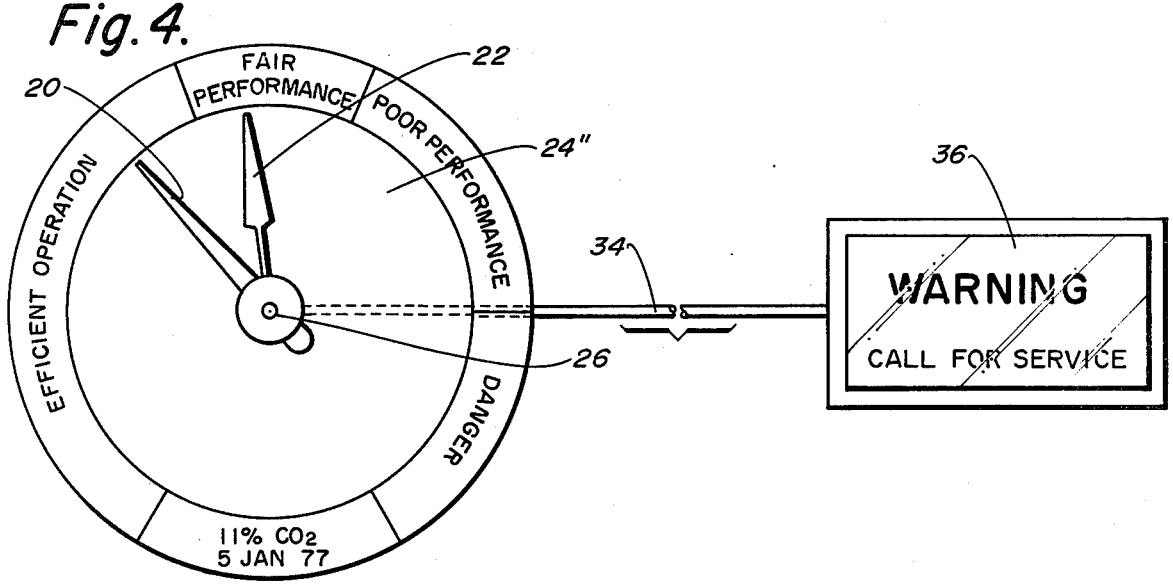
FIG. 4 is a view similar to FIG. 2 but of a third embodiment of an indicator face which is connected to a warning annunciator.

FIG. 4 denotes an indicator face 24" which is of a different type of word indicia describing the operating efficiency of the boiler. Also within FIG. 4 the pointer 22 is connected through an electrical wire 34 to an annunciator device 36 which is to call attention to the user that maintenance of the boiler is required. The annunciator 36 can take any of numerous forms such as a bell or warning light.

The indicator faces 24, 24' and 24" can be placed upon the thermometer face by several different means. A common type of securing means would be merely by forming the different indicator faces out of paper which include an adhesive backing. The actual securing of the indicator faces to the thermometer face 18 may be through a ring 38 which is to be releasably secured through a plurality of snaps 40 to the thermometer face 18.

The mathematical calculation to arrive at the efficiency of a boiler for a given value of carbon dioxide in a given type of fuel are readily available to those persons knowledgable in the field. In most instances calculations have been previously done and compiled into a series of graphs or scales giving the efficiency of operation for a particular type of fuel versus the percentage of carbon dioxide located within the exhaust gases. These scales are readily available.

What is claimed is:

1. The method of continuously monitoring the efficiency of an external combustion heat exchange apparatus which discharges combusted gases into the ambient, said method comprises the steps of:
    employing a temperature registering indicator which is to register the temperature of the combusted gases through the use of a movable pointer; and
    selecting a particular calibrated efficiency scale from a grouping of different scales and locating the selected scale adjacent the movable pointer wherein the selected scale represents the range of efficiency for the particular type of said combustion heat exchange apparatus, the scale being based on the percentage of carbon dioxide in the combustion gases and the type of fuel burned, therefore the position of the pointer is to denote accurately the value for the efficiency of the combusting process for the ascertained temperature of combusted gases to obtain a direct visible indication of combustion efficiency without having to resort to mathematical calculations or data manipulation.

2. The method as defined in claim 1 wherein the step of employing includes:
    using a second pointer to register the minimum level of efficiency achieved and the second pointer is to remain fixed at that position until a new minimum level is achieved.

3. An efficiency monitoring apparatus to continuously record the efficiency of the combustion of an external heat exchange process which discharges combusted gases into the ambient comprising:
    a temperature indicator having a first pointer movable across an indicator face;
    a scale located on said face, said scale including indicia to denote directly the efficiency of said combustion according to the position of said pointer, said indicia being based on the percentage of carbon dioxide in said combustion process and the type of fuel burned, there being available for selection any one of several different indicias to accommodate different types of external combustion heat exchange apparatuses, therefore, the position of said first pointer is to denote accurately the value for the efficiency of said combustion process for the ascertained temperature of the combusted gases to obtain a direct visible indication of combustion efficiency without having to resort to mathematical calculations or data manipulations.

4. Apparatus as defined in claim 3 wherein:
    said temperature indicator having a second pointer movable across said indicator face, said second pointer to move in conjunction with said first pointer in one direction but not movable in conjunction with said first pointer in the opposite direction.

5. Apparatus as defined in claim 3 wherein:
    said scale further including second indicia to denote directly the temperature of the combusted gases of said external heat exchange process.

6. Apparatus as defined in claim 5 wherein:
    said scale being mounted on a housing, said housing being removably secured to said face.

* * * * *